(12) United States Patent
Murase

(10) Patent No.: US 11,231,939 B2
(45) Date of Patent: Jan. 25, 2022

(54) TASK TEMPLATE CHANGING DEVICE AND NON-TRANSITORY COMPUTER READABLE MEDIUM STORING PROGRAM

(71) Applicant: FUJIFILM Business Innovation Corp., Tokyo (JP)

(72) Inventor: Eiichi Murase, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 180 days.

(21) Appl. No.: 16/446,640

(22) Filed: Jun. 20, 2019

(65) Prior Publication Data

US 2020/0004554 A1   Jan. 2, 2020

(30) Foreign Application Priority Data

Jul. 2, 2018   (JP) .............................. JP2018-126137

(51) Int. Cl.
| | | |
|---|---|---|
| *G06Q 10/06* | (2012.01) | |
| *G06F 9/46* | (2006.01) | |
| *G06Q 99/00* | (2006.01) | |
| *G06Q 10/00* | (2012.01) | |
| *G06F 9/445* | (2018.01) | |
| *G06F 9/54* | (2006.01) | |

(52) U.S. Cl.
CPC ................ *G06F 9/445* (2013.01); *G06F 9/54* (2013.01)

(58) Field of Classification Search
CPC ... G06F 8/71; G06F 8/65; G06F 9/445; G06F 9/54; G06F 9/46; G06Q 10/06; G06Q 10/10; G06Q 10/00; G06Q 10/0631; G06Q 10/06311
See application file for complete search history.

(56) References Cited

U.S. PATENT DOCUMENTS

| | | | |
|---|---|---|---|
| 10,891,569 B1 * | 1/2021 | Werner | ............ G06Q 10/06316 |
| 2015/0356120 A1 * | 12/2015 | Fujigaki | ................ G06F 40/186 |
| | | | 382/218 |

FOREIGN PATENT DOCUMENTS

| | | |
|---|---|---|
| JP | 2003186671 | 7/2003 |
| JP | 2005301496 | 10/2005 |
| JP | 2016143363 | 8/2016 |

OTHER PUBLICATIONS

Long et al., Template-based human supervised robot task programming, 7 pages (Year: 2016).*

* cited by examiner

*Primary Examiner* — Thuy Dao
(74) *Attorney, Agent, or Firm* — JCIPRNET

(57) ABSTRACT

A task template changing device includes a specification unit that specifies a relevant task template related to a changed task template on the basis of difference information from the changed task template in a case where any one of plural task templates obtained by customizing a reference task template is changed, and a reflection unit that reflects contents of the change on the relevant task template specified by the specification unit.

9 Claims, 17 Drawing Sheets

FIG. 4

| | | | | |
|---|---|---|---|---|
| ORIGINAL TASK TEMPLATE : | FOR SW DEVELOPMENT DEPARTMENT ▼ | | | |
| TASK TEMPLATE NAME : | | | | |
| USER ALLOCATION : | | | | |
| | (A) | (B) | (C) | |
| SCREEN LAYOUT : | ATTRIBUTE / IMAGE DISPLAY | LIST / ATTRIBUTE | IMAGE DISPLAY | |
| | LIST | IMAGE DISPLAY | LIST | |
| | ○ | ○ | ○ | |
| ATTRIBUTE DISPLAY ITEM : | | | | |
| LIST DISPLAY ITEM : | | | | |

CREATE

FIG. 5

Table 40 (24):

| NAME | ID | TYPE OF TASK | TASK | SETTING SET ID |
|---|---|---|---|---|
| RELEASE A | A123456789 | SW DEVELOPMENT | RELEASE | SS0000001 |
| RELEASE B | A123456788 | SW DEVELOPMENT | SW DEVELOPMENT | SS0000002 |
| RELEASE C | A123456787 | SW DEVELOPMENT | SW DEVELOPMENT | SS0000003 |

Table 42 (24):

| ID | PARENT TEMPLATE ID | DIFFERENCE INFORMATION | CHANGE FLAG |
|---|---|---|---|
| AA123456789 | A123456789 | 5 | FALSE |
| AA123456788 | A123456789 | 0 | TRUE |

FIG. 6

| SETTING SET ID | LAYOUT | ATTRIBUTE DISPLAY ITEM | LIST DISPLAY ITEM |
|---|---|---|---|
| SS0000001 | PATTERN A | REPORT, HORIZONTAL DEVELOPMENT, RECURRENCE PREVENTION | NAME, SIZE, UPDATE DATE AND TIME, UPDATER |
| SS0000002 | PATTERN B | REPORT, HORIZONTAL DEVELOPMENT, RECURRENCE PREVENTION | NAME, SIZE, UPDATE DATE AND TIME, UPDATER |
| SS0000003 | PATTERN C | REPORT, HORIZONTAL DEVELOPMENT, RECURRENCE PREVENTION | NAME, SIZE, UPDATE DATE AND TIME, UPDATER |

| THRESHOLD VALUE NAME | SETTING VALUE |
|---|---|
| FIRST THRESHOLD VALUE | 15 |
| SECOND THRESHOLD VALUE | 5 |

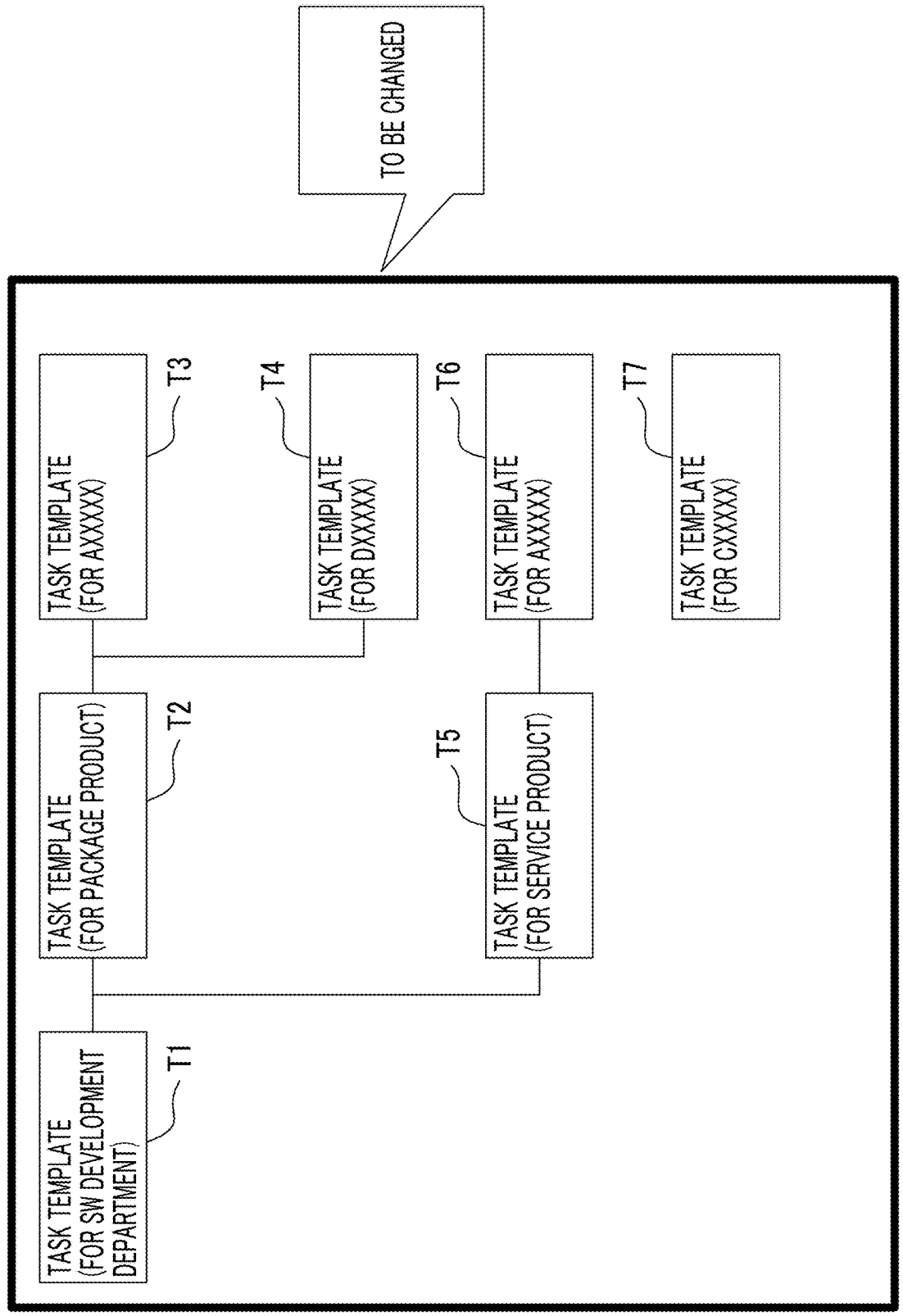

TASK TEMPLATE CHANGING DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-126137 filed Jul. 2, 2018.

BACKGROUND

(i) Technical Field

The present invention relates to a task template changing device and a non-transitory computer readable medium storing a program.

(ii) Related Art

For example, JP2016-143363A discloses a repository management system that manages a repository storing a template which is a model of a system configuration. The repository management system includes a storage unit and a retrieval unit. The storage unit stores one or more first templates including information regarding provided functions, first information in which an identifier of the first template and an identifier of one or more second templates obtained by changing a portion of the first template are associated with each other, and second information including indexes of non-functional requirements achieved by systems respectively constructed on the basis of the first and second templates. The retrieval unit receives a request including indexes of functional requirements and non-functional requirements, extracts one or more first templates providing a function specified by the functional requirements of the request on the basis of the first information, creates a template list including one or more extracted first templates and one or more second templates associated with the first templates, calculates the degree of achievement of non-functional requirements indicating how much the system constructed on the basis of each of the templates satisfies the indexes of the non-functional requirements of the request for each of the templates included in the template list on the basis of the second information, and outputs the template list and the degree of achievement of non-functional requirements of each of the templates.

In addition, JP2003-186671A discloses a method of creating a customized screen serving as a user interface of a document management application using a computer. In this method, a display screen determined from a selected task and a task process is generated and displayed, and an option item selected through the display screen is stored in storage means. Further, in this method, display parts constituting a portion or the entirety of the customized screen and required in accordance with the selected task process are extracted, the extracted display parts are revised in accordance with the selected option item, and the revised display parts are collected to create and display the customized screen.

In addition, JP2005-301496A discloses a task supporting system for supporting the entire management of a task, execution of a task process, and the like for a task for achieving an object by processing a plurality of task processes with a predetermined order relation. The task supporting system includes entire template creating means for creating an entire template for defining a task by necessary data with respect to each of the plurality of task processes, and individual template creating means for creating an individual template for individually defining the task processes by necessary data. The entire template creating means creates an entire template by receiving an input of necessary data on an input screen in a case where the input screen for inputting data for an entire template can be displayed. The individual template creating means automatically creates an individual template by extracting necessary data from the entire template created by the entire template creating means.

SUMMARY

Incidentally, services for preparing a task template for each task of a user and performing document management ranging from the creating of a document as a product of a task to the completion, approval, disclosure, and storage of the document have been provided. The task template as mentioned herein is data that services as a model for performing display setting of operation buttons of a User Interface (UI) screen, a layout, and the like so as to facilitate a task and managing setting of attributes regarding a document, a list, and the like. For example, in a case where a plurality of task templates are managed by one service, many task templates are used by being appropriately customized from the original task template for each user in accordance with the user's desire even in a case of the same task.

However, in a case where any one of the plurality of customized task templates is changed and it is also necessary to reflect the change on a relevant task template, the individual task templates have to be dealt with without omission, and the change may not be collectively reflected on the task templates.

Aspects of non-limiting embodiments of the present disclosure relate to a task template changing device and a non-transitory computer readable medium storing a program which are also capable of collectively reflecting a change on task templates related to a changed task template in a case where any one of a plurality of customized task templates is changed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present invention, there is provided a task template changing device including a specification unit that specifies a relevant task template related to a changed task template on the basis of difference information from the changed task template in a case where any one of a plurality of task templates obtained by customizing a reference task template is changed, and a reflection unit that reflects contents of the change on the relevant task template specified by the specification unit.

BRIEF DESCRIPTION OF THE DRAWINGS

Exemplary embodiment(s) of the present invention will be described in detail based on the following figures, wherein:

FIG. 4 is a front view illustrating an example of a task template creating screen according to the exemplary embodiment;

FIG. 5 is a diagram illustrating an example of a configuration of a task template DB and a task template relevant definition DB according to the exemplary embodiment;

FIG. 6 is a diagram illustrating an example of a configuration of a setting information DB and a threshold value definition DB according to the exemplary embodiment;

FIG. 17 is a diagram illustrating another example of a relation between task templates to be changed, according to the exemplary embodiment.

DETAILED DESCRIPTION

Hereinafter, an example of a mode for implementing the present invention will be described in detail with reference to the accompanying drawings.

Figure 1:
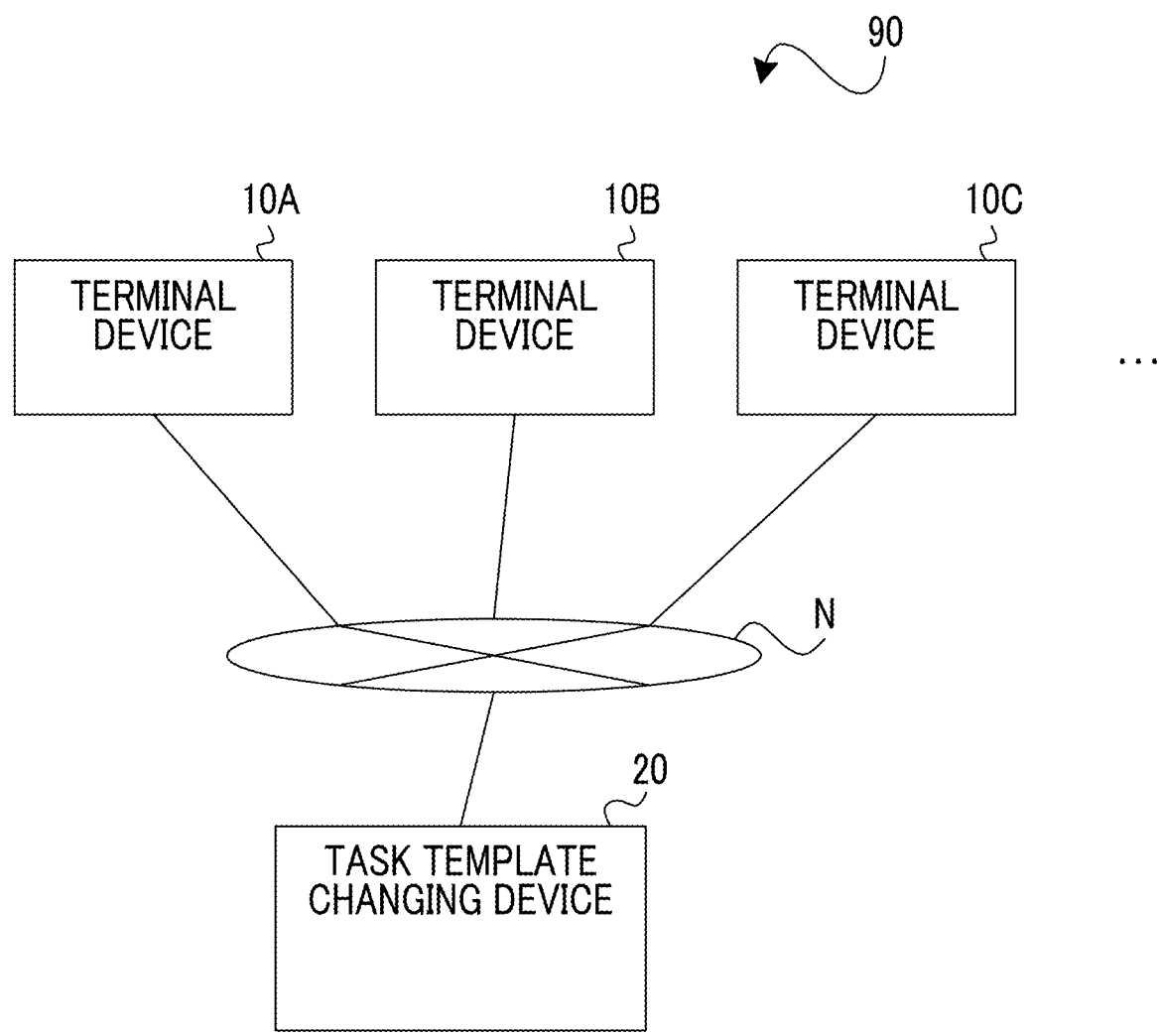
FIG. 1 is a diagram illustrating an example of a configuration of a task template changing system according to an exemplary embodiment.

FIG. 1 is a diagram illustrating an example of a configuration of a task template changing system 90 according to this exemplary embodiment.

As illustrated in FIG. 1, the task template changing system 90 according to this exemplary embodiment includes a plurality of terminal devices 10A, 10B, 10C, . . . and a task template changing device 20.

The task template changing device 20 according to this exemplary embodiment is connected to the plurality of terminal devices 10A, 10B, 10C, . . . used by a user through a network N. Meanwhile, as an example, the Internet, a Local Area Network (LAN), a Wide Area Network (WAN), or the like is applied as the network N. As an example, a general-purpose computer such as a server computer and a personal computer (PC) is applied as the task template changing device 20. Further, in a case where it is not necessary to give a description by distinguishing between the plurality of terminal devices 10A, 10B, 10C, . . . , the terminal devices 10A, 10B, 10C, . . . are also collectively referred to as a terminal device 10.

As an example, a general-purpose computer such as a personal computer (PC), a portable terminal device such as a smartphone or a tablet terminal, or the like is applied as the terminal device 10 according to this exemplary embodiment.

Figure 2:
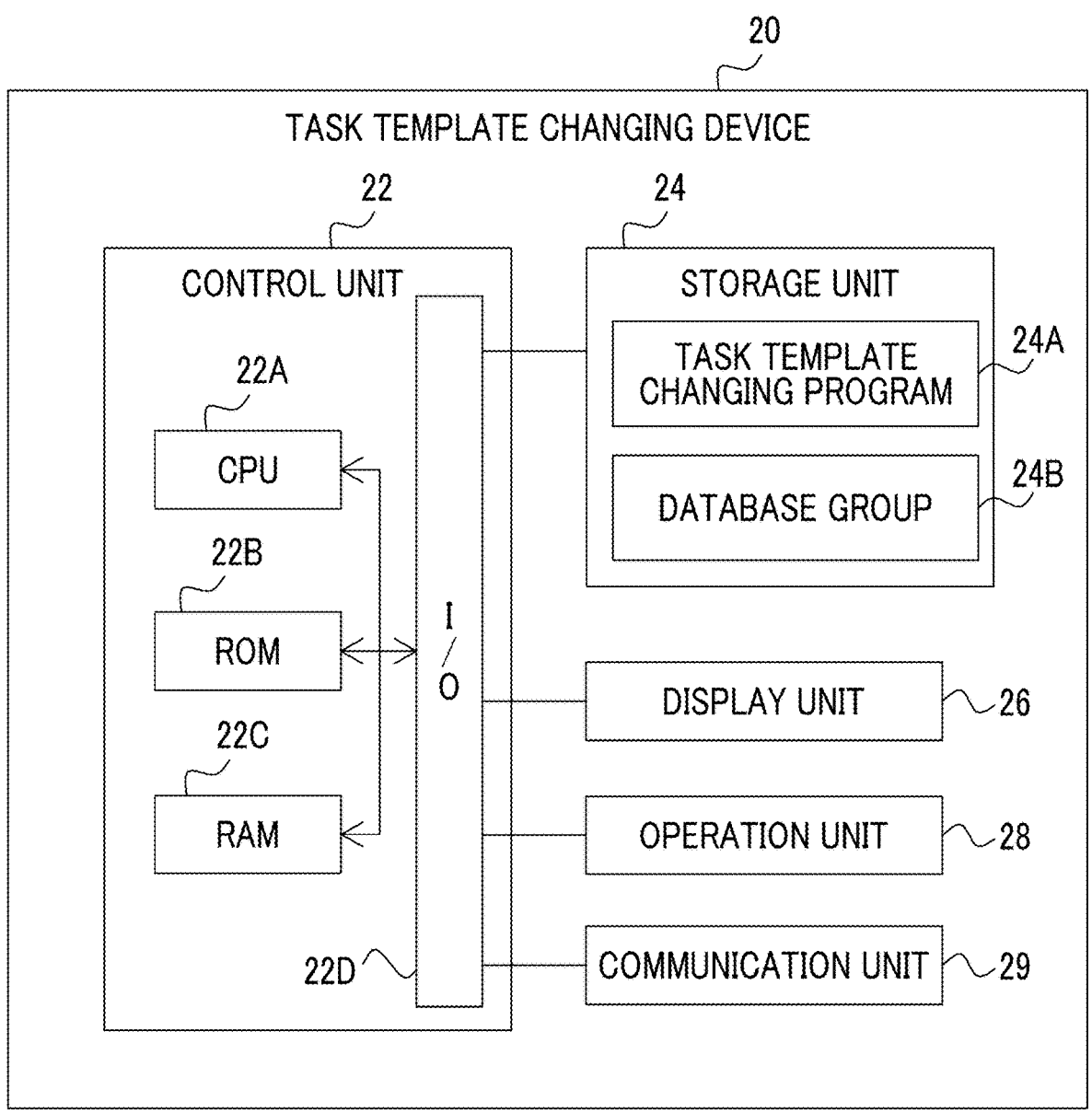
FIG. 2 is a block diagram illustrating an example of an electrical configuration of a task template changing device according to the exemplary embodiment.

FIG. 2 is a block diagram illustrating an example of an electrical configuration of the task template changing device 20 according to this exemplary embodiment.

As illustrated in FIG. 2, the task template changing device 20 according to this exemplary embodiment includes a control unit 22, a storage unit 24, a display unit 26, an operation unit 28, and a communication unit 29.

The control unit 22 includes a Central Processing Unit (CPU) 22A, a Read Only Memory (ROM) 22B, a Random Access Memory (RAM) 22C, and an input and output interface (I/O) 22D, and these units are connected to each other through a bus.

Functional units including the storage unit 24, the display unit 26, the operation unit 28, and the communication unit 29 are connected to the I/O 22D. These functional units can communicate with the CPU 22A through the I/O 22D.

The control unit 22 may be configured as a sub-control unit controlling a partial operation of the task template changing device 20, or may be configured as a portion of a main control unit controlling the overall operation of the task template changing device 20. An integrated circuit, such as Large Scale Integration (LSI), or an Integrated Circuit (IC) chip set is used for some or all of the blocks of the control unit 22. An individual circuit may be used for each of the above-described blocks, or a circuit obtained by integrating some or all of the circuits may be used. The above-described blocks may be integrally provided, or some of the blocks may be separately provided. Further, in the above-described blocks, some of the blocks may be separately provided. The integration of the control unit 22 is not limited to LSI, and a dedicated circuit or a general-purpose processor may be used.

As the storage unit 24, for example, a Hard Disk Drive (HDD), a Solid State Drive (SSD), a flash memory, or the like is used. In the storage unit 24, a task template changing program 24A for realizing a function as the task template changing device 20 according to this exemplary embodiment is stored. Meanwhile, the task template changing program 24A may be stored in the ROM 22B. In addition, a database group 24B to be described later is stored in the storage unit 24.

For example, the task template changing program 24A may be installed in the task template changing device 20 in advance. The task template changing program 24A may be realized by being stored in a non-volatile storage medium or distributed through the network N and being appropriately installed in the task template changing device 20. Meanwhile, as an example of the non-volatile storage medium, a Compact Disc Read Only Memory (CD-ROM), a magneto-optical disc, an HDD, a Digital Versatile Disc Read Only Memory (DVD-ROM), a flash memory, a memory card, and the like are assumed.

As the display unit 26, for example, a Liquid Crystal Display (LCD), an organic Electro Luminescence (EL) display, or the like is used. Various operation key groups used to operate the task template changing device 20 are provided in the operation unit 28.

The communication unit 29 is connected to the network N such as the Internet, a LAN, or a WAN, and can communicate with the terminal device 10 through the network N.

Incidentally, as described above, in a case where any one of a plurality of customized task templates is changed and it is also necessary to reflect the change on a relevant task template, the individual task templates have to be dealt with without omission, and the change may not be collectively reflected on the task templates.

Figure 3:
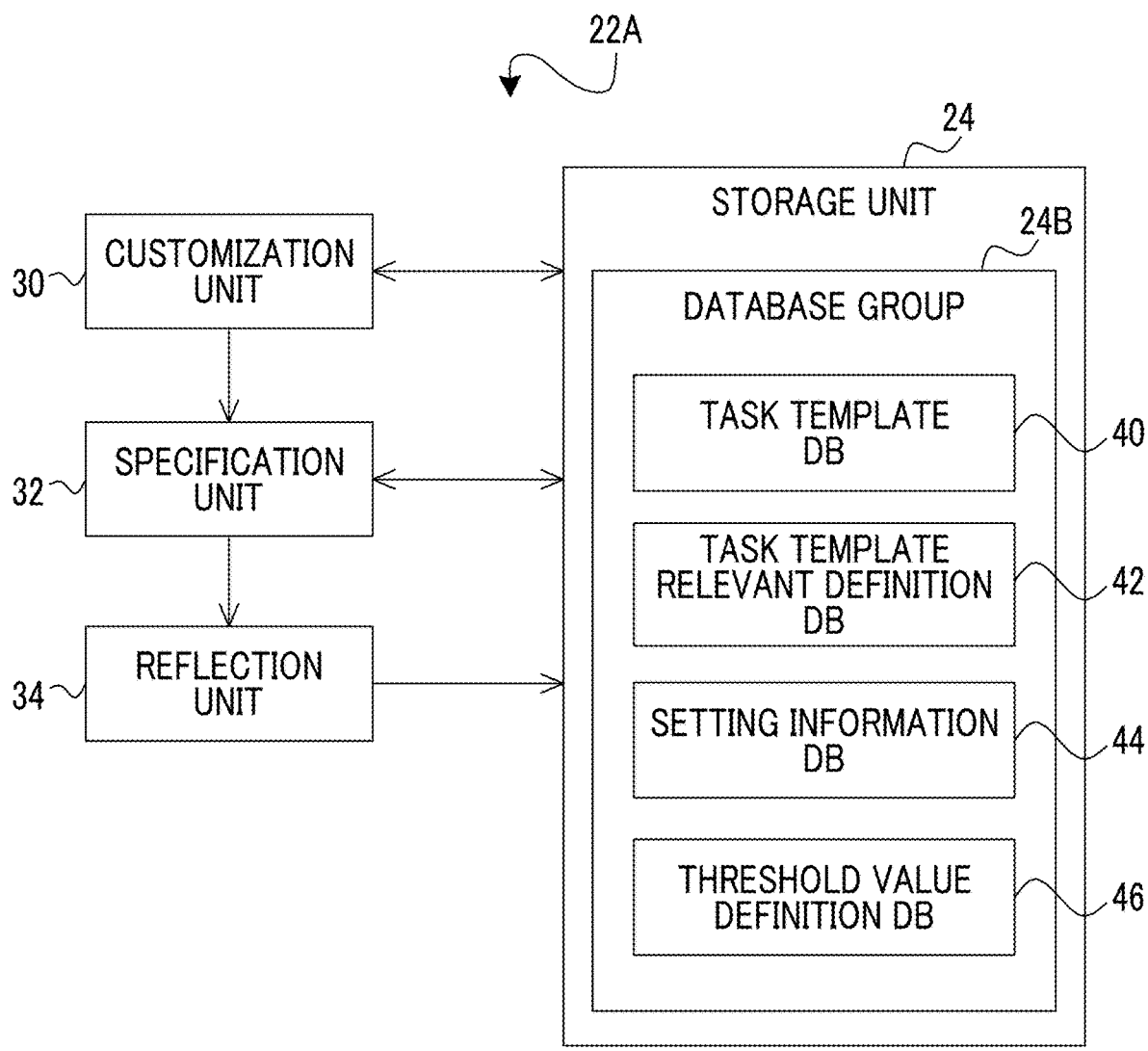
FIG. 3 is a block diagram illustrating an example of a functional configuration of the task template changing device according to the exemplary embodiment.

For this reason, the CPU 22A of the task template changing device 20 according to this exemplary embodiment writes the task template changing program 24A stored in the storage unit 24 in the RAM 22C and executes the written task template changing program to function as each unit illustrated in FIG. 3.

FIG. 3 is a block diagram illustrating an example of a functional configuration of the task template changing device 20 according to this exemplary embodiment.

As illustrated in FIG. 3, the CPU 22A of the task template changing device 20 according to this exemplary embodiment functions as a customization unit 30, a specification unit 32, and a reflection unit 34.

The customization unit 30 according to this exemplary embodiment customizes a reference task template to create an individual task template for each user using a task template creating screen illustrated in FIG. 4 as an example, and changes the customized task template.

FIG. 4 is a front view illustrating an example of a task template creating screen according to this exemplary embodiment.

As illustrated in FIG. 4, the task template creating screen according to this exemplary embodiment is provided from the task template changing device 20 to the terminal device 10, and is displayed on the terminal device 10. A user creates a task template obtained by customizing a reference task template individually for a user using the task template creating screen displayed on the terminal device 10.

The task template creating screen illustrated in FIG. 4 includes items such as an original task template, a task template name, user allocation, a screen layout, an attribute display item, and a list display item, as an example. A task template serving as a source of customization is designated for the original task template. In addition, a name of a task template created by customizing the original task template is input to the task template name. In addition, a user name serving as an allocation destination of a task template created by customization is input to the user allocation. Further, in the screen layout, a screen pattern of a task template can be selected, and any one of three patterns A, B, and C can be selected in this exemplary embodiment. Further, an attribute item regarding a document to be displayed on the screen is input to the attribute display item, and attributes such as a report, horizontal development, and recurrence prevention (not shown) are input as an example. In addition, an attribute item regarding a document list to be displayed on the screen is input to the list display item, and attributes such as a name, a size, an update date and time, and an updater (not shown) are input as an example.

The above-described database group 24B is stored in the storage unit 24 according to this exemplary embodiment. Meanwhile, the database group 24B may be stored in an external storage device. The database group 24B is configured to include a task template database (hereinafter, referred to as a "task template DB") 40, a task template relevant definition DB 42, a setting information DB 44, and a threshold value definition DB 46.

FIG. 5 is a diagram illustrating an example of configurations of the task template DB 40 and the task template relevant definition DB 42 according to this exemplary embodiment.

In addition, FIG. 6 is a diagram illustrating an example of configurations of the setting information DB 44 and the threshold value definition DB 46 according to this exemplary embodiment.

The task template DB 40 illustrated in an upper diagram of FIG. 5 is a DB for managing a task template, and a name, an Identification (ID), a type of task, a task, a setting set ID, and the like are registered as an example. Meanwhile, the name indicates a name of a task template, and the ID indicates an identifier of a task template. The type of task indicates a type of task to which a task template is applied, and the task indicates a task to which a task template is applied. The setting set ID indicates an identifier of setting information to be described later.

The task template relevant definition DB 42 illustrated in a lower diagram of FIG. 5 is a DB for managing difference information, information representing a relationship, and the like of a task template obtained by customization, and an ID, a parent template ID, difference information, a change flag, and the like are registered as an example. Meanwhile, the ID indicates an identifier of a customized task template. The parent template ID is an example of information representing a relationship, and indicates an identifier of a customized original task template (parent template). Meanwhile, although not shown in the drawing, a child template ID which is an identifier of a child template and a copy template ID which is an identifier of a copy template are also registered as the information representing a relationship. The difference information is information representing a difference between a parent template and a child template, and is represented by the number of different setting items, or the like as an example. The change flag is information indicating whether or not a task template has been changed, and "TRUE" is set in a case of approval in "change content notification" illustrated in FIG. 15 to be described later, "FALSE" is set in a case of rejection, and a blank is left in a case of reservation.

The setting information DB 44 illustrated in an upper diagram of FIG. 6 is a DB for managing a layout and attributes in association with the setting set ID defined in the task template DB 40, and a setting set ID, a layout, an attribute display item, a list display item, and the like are registered as an example. The setting set ID indicates an identifier of the above-described setting information, and the layout indicates a pattern of a layout of the display of the entire screen. The attribute display item indicates an attribute item regarding a document to be displayed on the screen, and the list display item indicates an attribute item regarding a document list to be displayed on the screen. The layout, the attribute display item, and the list display item correspond to the screen layout, the attribute display item, and the list display item in the task template creating screen illustrated in FIG. 4 described above.

The threshold value definition DB 46 illustrated in a lower diagram of FIG. 6 is a DB for managing a threshold value used for the determination of difference information, and a threshold value name, a setting value, and the like are registered as an example. In this exemplary embodiment, a setting value for each of a first threshold value and a second threshold value to be described later is stored as an example. Each of the first threshold value and the second threshold value is appropriately set in accordance with, for example, the number of task templates to be changed, the number of setting items, or the like. Meanwhile, a relation of the second threshold value<the first threshold value is established.

Next, in a case where any one of a plurality of task templates obtained by customization performed by the customization unit 30 is changed, the specification unit 32 according to this exemplary embodiment specifies a relevant task template related to the changed task template on the basis of difference information from the changed task template. Specifically, the specification unit 32 specifies a task template in which a value indicated by the difference information is less than the first threshold value as a relevant task template. Meanwhile, the first threshold value is acquired from the threshold value definition DB 46 illustrated in the lower diagram of FIG. 6 described above. In addition, each of the plurality of task templates obtained by the customization is a task template created from a reference task template. In addition, the difference information is information indicating a difference between setting contents after the customization regarding the changed task template and setting contents after the customization regarding another task template. Specifically, as an example of the difference information, a difference in the number of setting items, and the like are applied. The difference includes a difference due to addition, deletion, and change of a setting item.

With regard to the difference information, weighting may be performed in accordance with each of the addition, deletion, and change of a setting item. For example, weighting is performed by setting "2" in a case of the addition of a setting item, "3" in a case of the deletion of a setting item, and "1" in a case of the change of a setting value in a setting item.

The specification unit 32 according to this exemplary embodiment may specify a relevant task template using information representing a relationship between a changed task template and another task template. The information representing a relationship as mentioned herein is information representing any one of a parent-child relation and a copy relation. The parent-child relation is a relation defined by setting a task template on an upstream side as a parent template and setting a task template on a downstream side as a child template with respect to a changed task template. In addition, the copy relation is a relation defined as the same task template with respect to a changed task template.

The reflection unit 34 according to this exemplary embodiment reflects contents of a change on a relevant task template specified by the specification unit 32. Specifically, in a case where a value indicated by the difference value is equal to or less than the second threshold value in a relevant task template, the reflection unit 34 reflects contents of a change. Meanwhile, the second threshold value is acquired from the threshold value definition DB 46 illustrated in the lower diagram of FIG. 6 described above.

Here, in a case where the relevant task template is a task template having a parent relation with respect to the changed task template, the reflection unit 34 may give notice of contents of a change instead of reflecting the contents of the change. Further, in a case where the relevant task template is a task template having a child relation with respect to the changed task template, the reflection unit 34 may selectively perform the reflection of the contents of the change or the notification of the contents of the change on the basis of the difference information. In this case, the reflection unit 34 reflects the contents of the change on the relevant task template in a case where the contents of the change are received with respect to the notification of the contents of the change.

In addition, the reflection unit 34 may give notice of contents of a change instead of reflecting the contents of the change in a case where the relevant task template is a task template in which a value indicated by the difference information is less than the first threshold value and is larger than the second threshold value. Also in this case, the reflection unit 34 reflects the contents of the change on the relevant task template in a case where the contents of the change are received with respect to the notification of the contents of the change.

Next, an operation of the task template changing device 20 according to this exemplary embodiment will be described with reference to FIGS. 7 to 10.

Figure 7:
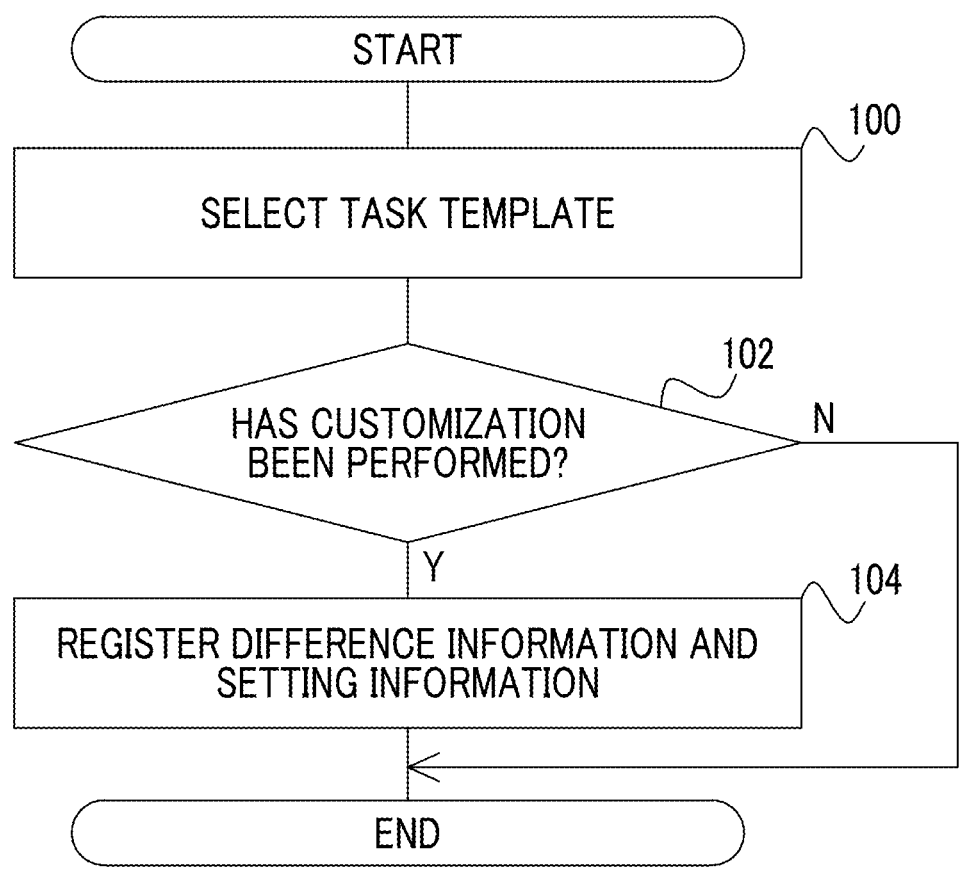
FIG. 7 is a flowchart illustrating an example of a flow of a registration process based on a task template changing program according to the exemplary embodiment.

FIG. 7 is a flowchart illustrating an example of a flow of a registration process performed by the task template changing program 24A according to this exemplary embodiment.

First, in a case where the read-out of the task template creating screen (see FIG. 4) is detected by the task template changing device 20, the task template changing program 24A is started up, and the following steps are executed.

In step 100 of FIG. 7, the customization unit 30 selects an original task template in accordance with an instruction received from the task template creating screen illustrated in FIG. 4, and displays the selected original task template on the terminal device 10.

In step 102, the customization unit 30 determines whether or not customization has been performed on the original task template. In a case where it is determined that customization has been performed (a case of affirmative determination), the processing proceeds to step 104. In a case where it is determined that customization has not been performed (a case of negative determination), the registration process according to the task template changing program 24A is terminated.

In step 104, the customization unit 30 registers difference information between the customized task template and the original task template in the task template relevant definition DB 42, and registers setting information regarding the customized task template in the setting information DB 44. The registration process based on the task template changing program 24A is terminated.

Figure 8:
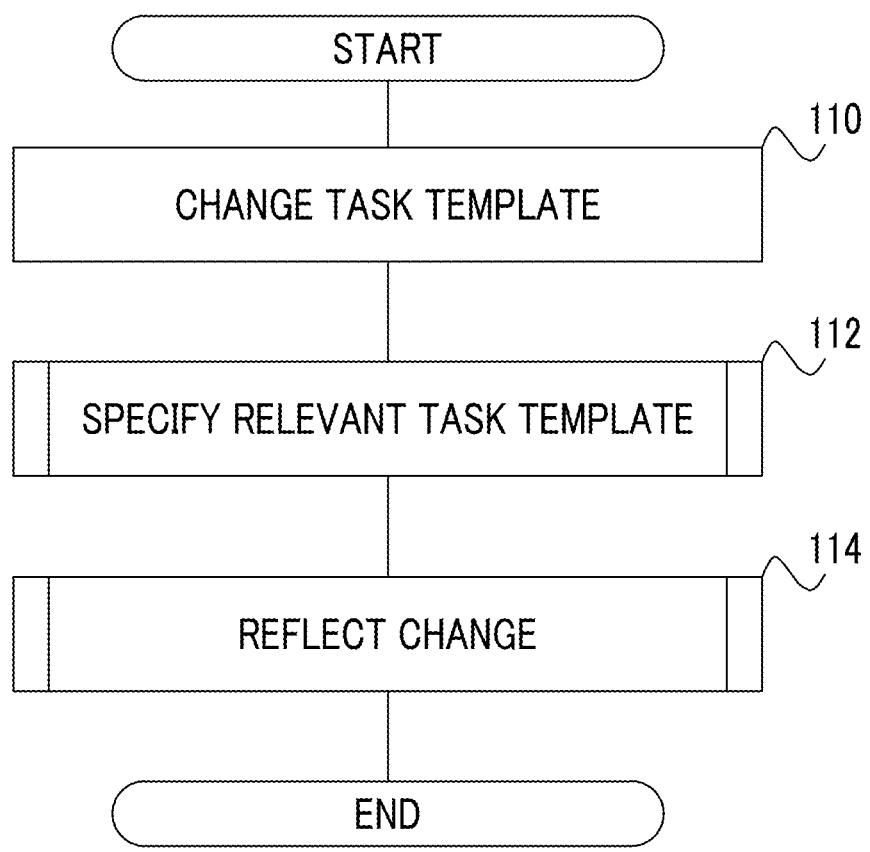
FIG. 8 is a flowchart illustrating an example of a flow of a changing process based on a task template changing program according to the exemplary embodiment.

FIG. 8 is a flowchart illustrating an example of a flow of a changing process based on the task template changing program 24A according to this exemplary embodiment.

First, in a case where the read-out of any of the customized task templates is detected by the task template changing device 20, the task template changing program 24A is started up, and the following steps are executed.

In step 110 of FIG. 8, the customization unit 30 changes any one of a plurality of task templates obtained by customization. Meanwhile, hereinafter, task templates other than the changed task template, among the plurality of task templates obtained by customization, are set to be task templates to be changed.

In step 112, the specification unit 32 specifies a relevant task template related to the changed task template on the basis of difference information between the task template changed in step 110 and the task templates to be changed. A process of specifying a relevant task template will be specifically described with reference to FIG. 9.

Figure 9:
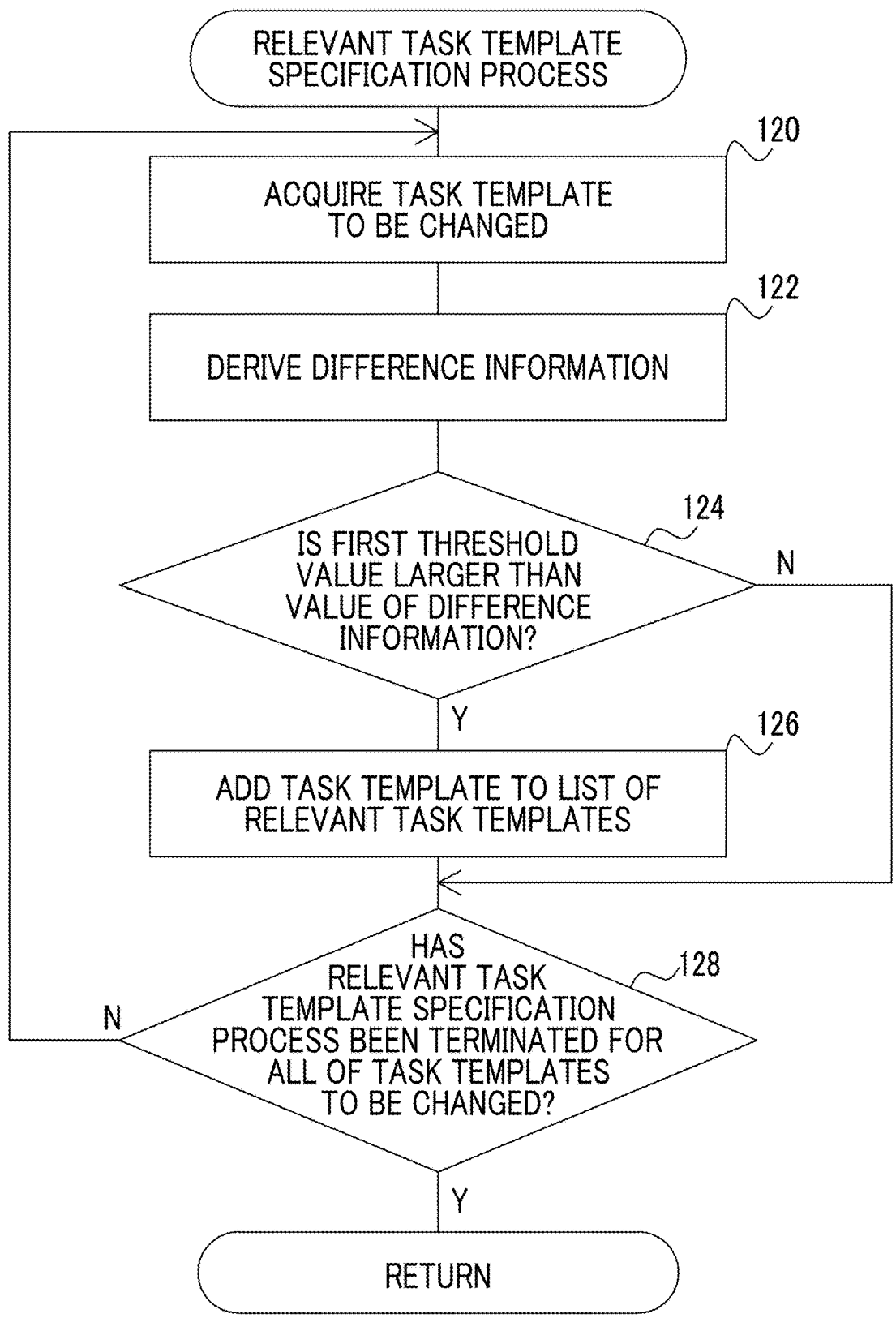
FIG. 9 is a flowchart illustrating an example of a flow of a relevant task template specification process according to the exemplary embodiment.

FIG. 9 is a flowchart illustrating an example of a flow of a relevant task template specification process according to this exemplary embodiment.

In step 120 of FIG. 9, the specification unit 32 acquires a task template to be changed.

In step 122, the specification unit 32 derives difference information between a changed task template and the task template to be changed.

In step 124, the specification unit 32 determines whether or not a value indicated by the difference information derived in step 122 is less than a first threshold value. In a case where it is determined that the value indicated by the difference information is less than the first threshold value (a case of affirmative determination), the processing proceeds to step 126. In a case where it is determined that the value indicated by the difference information is equal to or larger than the first threshold value (a case of negative determination), the processing proceeds to step 128.

In step 126, the specification unit 32 specifies the task template to be changed as a relevant task template, and adds the specified task template to a list of relevant task templates.

In step 128, the specification unit 32 determines whether or not a relevant task template specification process has been performed on all of the task templates to be changed. In a case where it is determined that a relevant task template specification process has been performed (a case of affirmative determination), the processing returns to step 114 of FIG. 8. In a case where it is determined that a relevant task template specification process has not been performed (a case of negative determination), the processing returns to step 120 and is repeated.

Next, referring back to FIG. 8, in step 114, the reflection unit 34 reflects contents of the change on the relevant task template specified in step 112, and the changing process based on the task template changing program 24A is terminated. The change reflection process will be specifically described with reference to FIG. 10.

Figure 10:
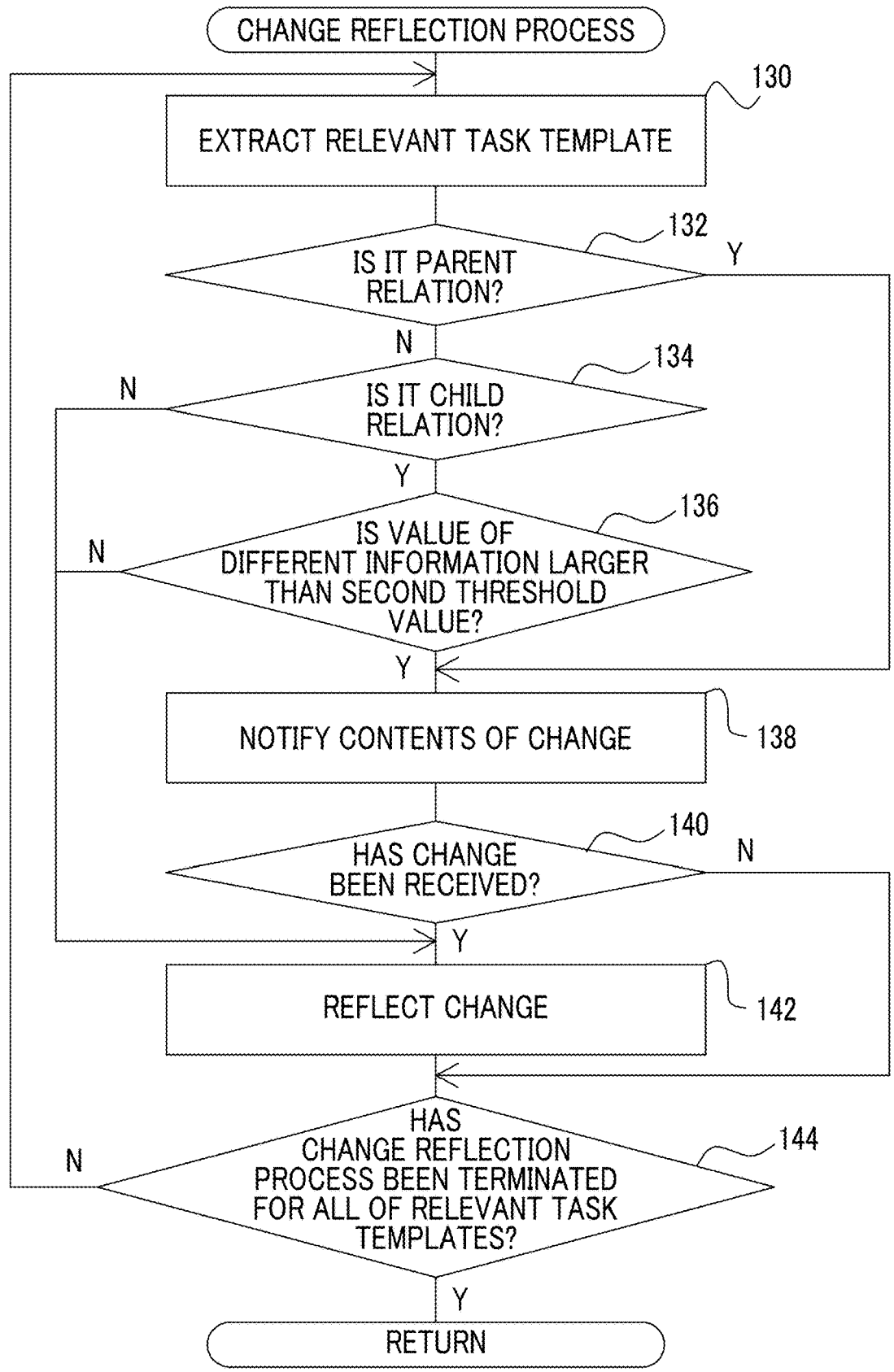
FIG. 10 is a flowchart illustrating an example of a flow of a change reflection process according to the exemplary embodiment.

FIG. 10 is a flowchart illustrating an example of a flow of the change reflection process according to this exemplary embodiment.

In step 130 of FIG. 10, the reflection unit 34 extracts one relevant task template from the above-described list of relevant task templates.

In step 132, the reflection unit 34 determines whether or not the relevant task template extracted in step 130 has a parent relation with respect to the changed task template. Whether or not the relevant task template has a parent relation with respect to the changed task template is determined with reference to the task template relevant definition DB 42 illustrated in the lower diagram of FIG. 5 described above. In a case where it is determined that the relevant task template has a parent relation with respect to the changed task template (a case of affirmative determination), the processing proceeds to step 138. In a case where it is determined that the relevant task template does not have a parent relation with respect to the changed task template (a case of negative determination), the processing proceeds to step 134.

In step 134, the reflection unit 34 determines whether or not the relevant task template extracted in step 130 has a child relation with respect to the changed task template. As described above, whether or not the relevant task template has a child relation with respect to the changed task template is determined with reference to the task template relevant definition DB 42 illustrated in the lower diagram of FIG. 5. In a case where it is determined that the relevant task template has a child relation with respect to the changed task template (a case of affirmative determination), the processing proceeds to step 136. In a case where it is determined that the relevant task template does not have a child relation with respect to the changed task template (a case of negative determination), the processing proceeds to step 142.

In step 136, the reflection unit 34 determines whether or not a value indicated by difference information between the changed task template and the relevant task template is larger than the second threshold value (<the first threshold value). In a case where it is determined that a value indicated by difference information between the changed task template and the relevant task template is larger than the second threshold value (a case of affirmative determination), the processing proceeds to step 138. In a case where it is determined that a value indicated by difference information between the changed task template and the relevant task template is equal to or less than the second threshold value (a case of negative determination), the processing proceeds to step 142.

In step 138, the reflection unit 34 notifies the terminal device 10, which is used by a user of the relevant task template, of contents of the change.

In step 140, the reflection unit 34 determines whether or not an instruction for reception has been given with respect to the contents of the change notified in step 138. In a case where it is determined that an instruction for reception has been given (a case of affirmative determination), the processing proceeds to step 142. In a case where it is determined that an instruction for reception has not been given (a case of negative determination), the processing proceeds to step 144.

In step 142, the reflection unit 34 reflects the change regarding the changed task template on the relevant task template in accordance with the above-described instruction for reception.

In step 144, the reflection unit 34 determines whether or not the change reflection process has been performed on all of the relevant task templates included in the list of relevant task templates. In a case where it is determined that the change reflection process has been performed (a case of affirmative determination), the processing returns to step 114 of FIG. 8. In a case where it is determined that the change reflection process has not been performed (a case of negative determination), the processing returns to step 130 and is repeated.

Next, a changing process performed by the task template changing device 20 according to this exemplary embodiment will be further specifically described with reference to FIGS. 11 to 17.

Figure 11:
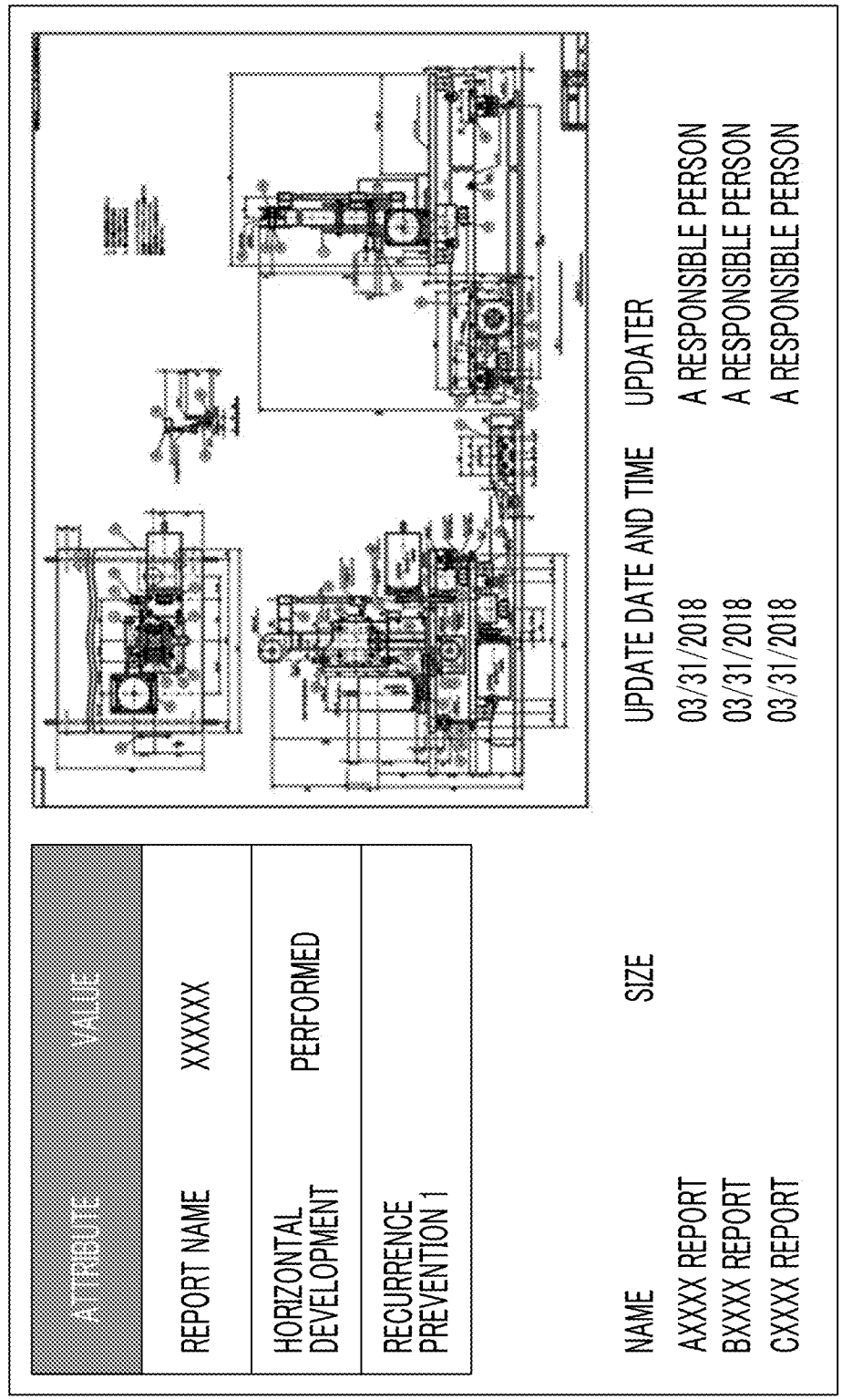
FIG. 11 is a front view illustrating an example of a task template screen according to the exemplary embodiment.

FIG. 11 is a front view illustrating an example of a task template screen according to this exemplary embodiment.

In this exemplary embodiment, a certain user manages a document regarding a task using the task template screen illustrated in FIG. 11 as an example. Meanwhile, the task template screen is provided from the task template changing device 20 to the terminal device 10 and is displayed on the terminal device 10.

Figure 12:
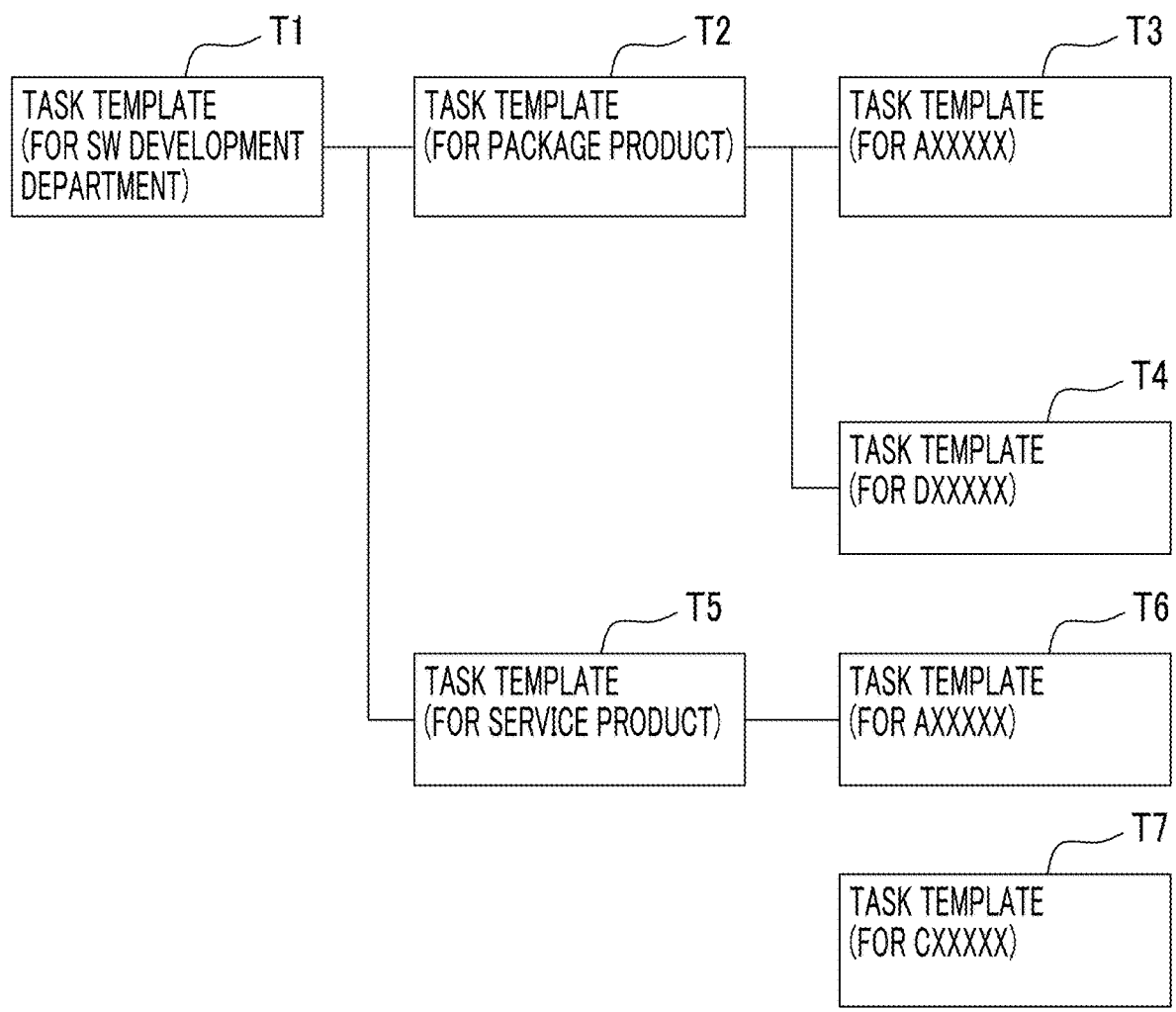
FIG. 12 is a diagram illustrating an example of a relation between task templates according to the exemplary embodiment.

FIG. 12 is a diagram illustrating an example of a relation between task templates according to this exemplary embodiment.

In this exemplary embodiment, as an example, a case is assumed in which a task template T1 for a software (SW) development department is set to be a task template serving as a source of customization and any one of a plurality of task templates T2 to T7 obtained by customization is changed.

Figure 13:
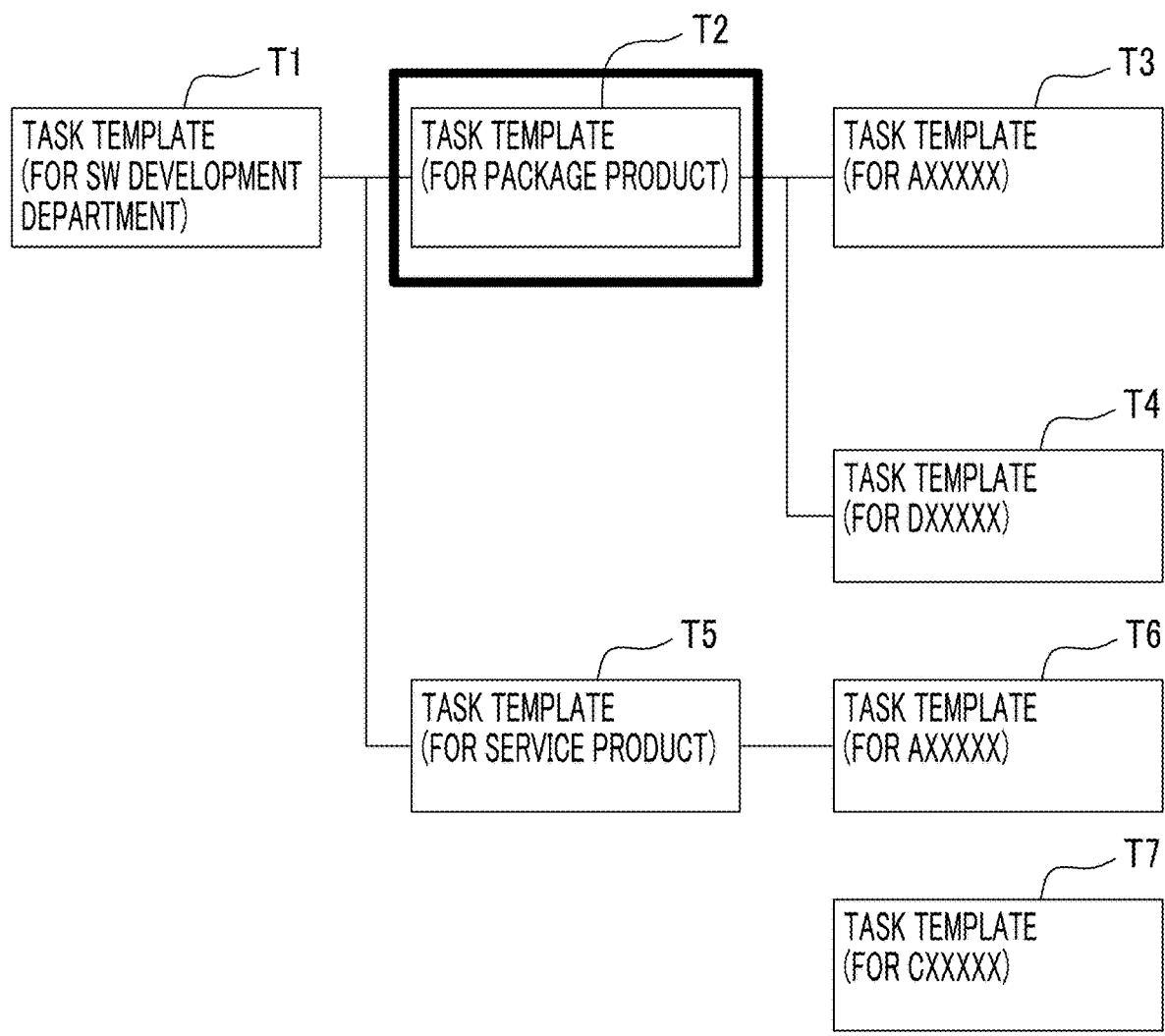
FIG. 13 is a diagram illustrating a change in a task template according to the exemplary embodiment.

FIG. 13 is a diagram illustrating a change in a task template according to this exemplary embodiment.

Figure 14:
FIG. 14 is a front view illustrating an example of a changed task template screen according to the exemplary embodiment.

FIG. 14 is a front view illustrating an example of a changed task template screen according to the exemplary embodiment.

For example, in a case where a task template T2 for a package product illustrated in FIG. 13 is changed, a user of the task template T2 changes the task template T2 from a task template screen displayed on his or her own terminal device 10. As a result, as illustrated in FIG. 14, "recurrence prevention 2" indicated by an arrow is added as an attribute item on the task template screen of the task template T2 for a package product.

In this exemplary embodiment, the above-described change is reflected on a relevant task template related to the task template T2. Specifically, the terminal device 10, which is used by the user of the task template T1 for an SW development department serving as a parent of the task template T2, is notified of contents of the change as illustrated in FIG. 15 as an example.

Figure 15:
FIG. 15 is a front view illustrating an example of a task template screen in which change content notifications are superimposed on each other according to the exemplary embodiment.

FIG. 15 is a front view illustrating an example of a task template screen in which change content notifications are superimposed on each other according to the exemplary embodiment.

As illustrated in FIG. 15, the user of the task template T1 for an SW development department selects whether or not to accept a change and gives an instruction with respect to a change content notification (indicated by an arrow) superimposed on the task template screen displayed on his or her own terminal device 10. Meanwhile, in the change content notification, buttons of "approval of change", "reservation", and "rejection" are displayed in response to "recurrence prevention 2" which is the attribute item added above so as to be selectable by the user.

The task template changing device 20 according to this exemplary embodiment determines that a change for adding "recurrence prevention 2" has been approved in a case where the "approval of change" button is selected. Further, in a case where the "reservation" button is selected, it is determined that a change for adding "recurrence prevention 2" has been reserved. In a case of the reservation, it may be inquired whether to accept a change again after a predetermined period of time elapses. Further, in a case where the "rejection" button is selected, it is determined that a change for adding "recurrence prevention 2" has been rejected.

Figure 16:
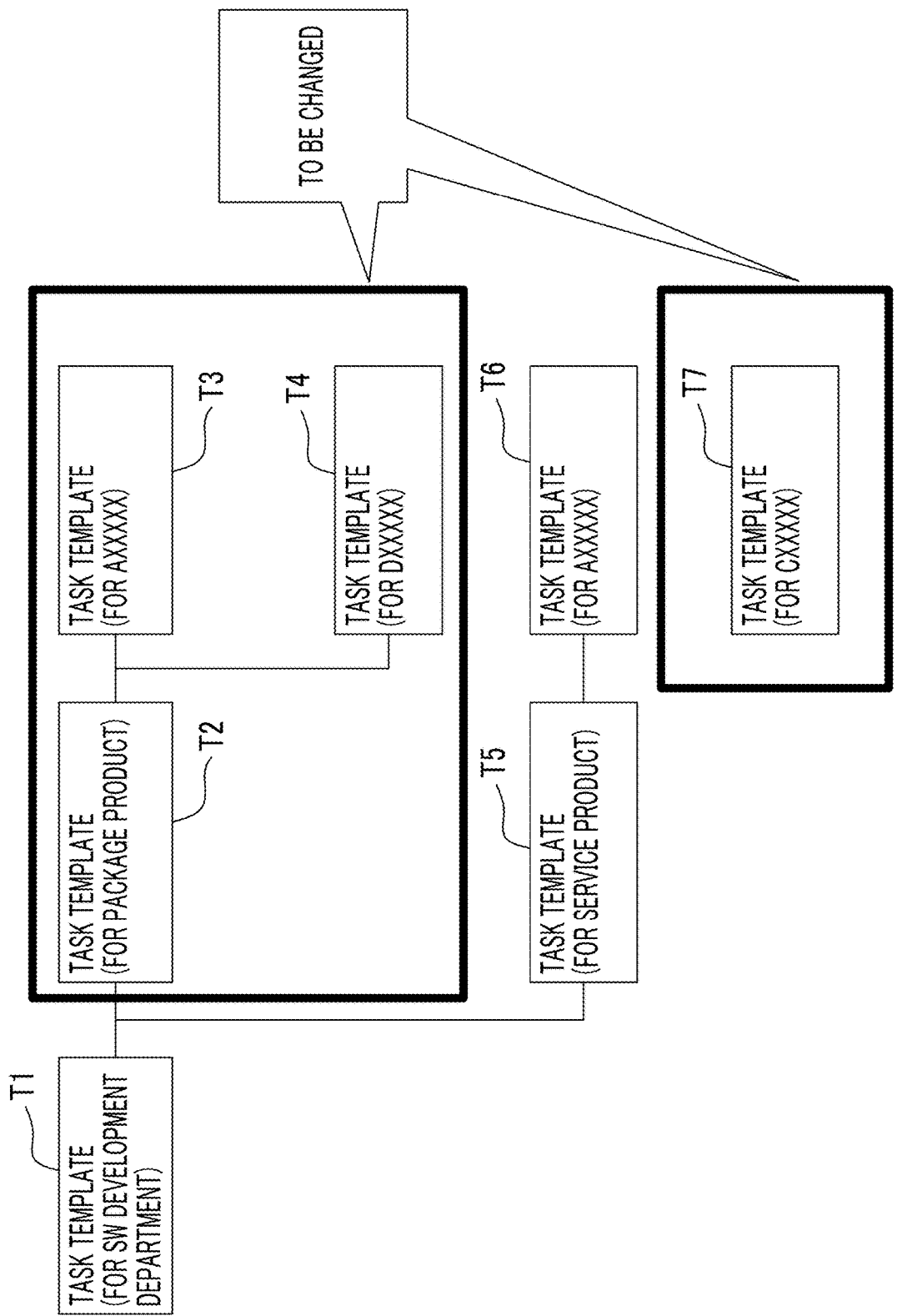
FIG. 16 is a diagram illustrating an example of a relation between task templates to be changed, according to the exemplary embodiment.

FIG. 16 is a diagram illustrating an example of a relation between task templates to be changed, according to the exemplary embodiment.

The task template changing device 20 according to this exemplary embodiment specifies each of task templates T3 and T4 having a child relation with respect to a task template T2 as a relevant task template to be changed on the basis of difference information from the task template T2 as illustrated in FIG. 16 as an example. In addition, a task template T5 for a service product and a task template T6 as a child of the task template T5 which have a sibling relation with respect to the task template T2 are excluded from objects to be changed, on the basis of difference information from the task template T2. Further, a task template T7 which is a child of the task template T5 is specified as a relevant task template to be changed, on the basis of difference information from the task template T2.

FIG. 17 is a diagram illustrating another example of a relation between task templates to be changed, according to the exemplary embodiment.

The task template changing device 20 according to this exemplary embodiment specifies each of task templates T3 to T7 as a relevant task template to be changed, on the basis of difference information from a task template T2 as illustrated in FIG. 17 as an example. Meanwhile, in this case, an "approval of change" button is selected for a task template T1 which has a parent relation with respect to the task template T2, and thus the task template T1 is specified as a relevant task template to be changed.

In this manner, according to this exemplary embodiment, in a case where any one of a plurality of customization task templates is changed, a change is collectively reflected on task templates related to the changed task template. For this reason, the efficiency of a change reflection operation for task templates is increased.

As an exemplary embodiment, a task template changing device has been described above. The exemplary embodiment may be implemented in the form of a program for causing a computer to execute functions of units included in the task template changing device. The exemplary embodiment may be implemented in the form of a storage medium readable by a computer storing the program.

In addition, the configuration of the task template changing device described in the exemplary embodiment is an example, and may be changed in accordance with conditions without departing from the scope of the invention.

In addition, the flow of the processing of the program described in the exemplary embodiment is also an example, and deletion of unnecessary steps, addition of new steps, or change of the order of processing may be performed without departing from the scope of the invention.

Further, in the above-described exemplary embodiment, a case where processing according to the exemplary embodiment is realized by a software configuration using a computer by executing a program has been described, but the invention is not limited thereto. For example, the exemplary embodiment may be realized by a hardware configuration or a combination of a hardware configuration and a software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A task template changing device comprising:
a specification unit stored in a memory, which specifies a relevant task template related to a changed task template on the basis of difference information from the changed task template in a case where any one of a plurality of task templates obtained by customizing a reference task template is changed; and
a reflection unit stored in a non-transitory computer readable medium, which reflects contents of the change on the relevant task template specified by the specification unit, wherein the specification unit stored in the memory specifies a task template in which a value indicated by the difference information is less than a first threshold value as the relevant task template.

2. The task template changing device according to claim 1, further comprising:

a storage unit that stores information representing a relationship between the changed task template and another task template, wherein the specification unit stored in the memory further specifies the relevant task template on the basis of the information representing the relationship.

3. The task template changing device according to claim 2, wherein the information representing the relationship is information representing any one of a parent-child relation and a copy relation.

4. The task template changing device according to claim 3, wherein the reflection unit stored in the non-transitory computer readable medium further gives notice of the contents of the change in a case where the relevant task template is a task template having a parent relation with respect to the changed task template.

5. The task template changing device according to claim 4, wherein the reflection unit stored in the non-transitory computer readable medium reflects the contents of the change on the relevant task template in a case where the contents of the change are received with respect to notification of the contents of the change.

6. The task template changing device according to claim 3, wherein the reflection unit stored in the non-transitory computer readable medium selectively performs the reflection of the contents of the change or notification of the contents of the change on the basis of the difference information, in a case where the relevant task template is a task template having a child relation with respect to the changed task template.

7. The task template changing device according to claim 6, wherein the reflection unit stored in the non-transitory computer readable medium reflects the contents of the change on the relevant task template in a case where the contents of the change are received with respect to notification of the contents of the change.

8. The task template changing device according to claim 1, wherein the reflection unit stored in the non-transitory computer readable medium gives notice of the contents of the change instead of reflecting the contents of the change, in a case where the relevant task template is a task template in which the value indicated by the difference information is less than the first threshold value and is larger than a second threshold value smaller than the first threshold value.

9. The task template changing device according to claim 8, wherein the reflection unit stored in the non-transitory computer readable medium reflects the contents of the change in a case where the relevant task template is a task template in which the value indicated by the difference information is equal to or less than the second threshold value.

* * * * *